United States Patent
Graur et al.

(10) Patent No.: US 7,305,334 B2
(45) Date of Patent: Dec. 4, 2007

(54) METHODOLOGY FOR IMAGE FIDELITY VERIFICATION

(75) Inventors: Ioana Graur, Poughkeepsie, NY (US); Kafai Lai, Poughkeepsie, NY (US); Rama N. Singh, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 10/908,724

(22) Filed: May 24, 2005

(65) Prior Publication Data
US 2006/0282246 A1   Dec. 14, 2006

(51) Int. Cl.
*G06F 17/50*   (2006.01)

(52) U.S. Cl. .............................. 703/14; 716/19; 716/21

(58) Field of Classification Search ................ 703/14; 719/19, 21; 716/19, 21
See application file for complete search history.

(56) References Cited

U.S. PATENT DOCUMENTS

| | | | |
|---|---|---|---|
| 5,965,306 A * | 10/1999 | Mansfield et al. | 430/22 |
| 6,042,257 A * | 3/2000 | Tsudaka | 700/121 |
| 6,370,679 B1 * | 4/2002 | Chang et al. | 716/19 |
| 6,373,975 B1 * | 4/2002 | Bula et al. | 382/144 |
| 6,453,457 B1 * | 9/2002 | Pierrat et al. | 716/19 |
| 6,757,645 B2 * | 6/2004 | Chang et al. | 703/13 |
| 7,043,712 B2 * | 5/2006 | Mukherjee et al. | 716/19 |

OTHER PUBLICATIONS

Graur et al, "Image Fidelity Verification-ContourIVF", Proceedings of SPIE, vol. 5379, May 3, 2004.*

Xiong et al, "Is Gate Line Edge Roughness a First-Order Issue in Affecting the Performance of Deep Sub-Micro Bulk MOSFET Devices?", IEEE Transactions on Semiconductor Manufacturing, vol. 17, No. 3, Aug. 2004.*

Chen et al, "Analysis of the Impact of Proximity Correction Algorithms on Circuit Performance", IEEE Transactions on Semiconductor Manufacturing, vol. 12, No. 3, Aug. 1999.*

Qian et al; "Advanced Physical Models for Mask Data Verification and Impacts On Physical Layout Synthesis", Proceedings of the Fourth International Symposium on Quality Electronic Design, 2003.*

Phil Oldiges, Qinghuang Lin, Karen Petrillo, Martha Sanchez, Meikei Ieong, Mike Hargrove, "Modeling Line Edge Roughness Effects in sub 100 Nanometer Gate Length Devices" IEEE 0-7803-6279, 2000, pp. 131-134.*

Title: "New Concepts In OPC" Nick Cobb and Yuri Granik Mentor Graphics Corp., San Jose, California 11 Pages, May 2004.

* cited by examiner

*Primary Examiner*—Paul Rodriguez
*Assistant Examiner*—Dwin McTaggart Craig
(74) *Attorney, Agent, or Firm*—DeLio & Peterson, LLC; Peter W. Peterson; Ira D. Blecker

(57) ABSTRACT

A method for predicting functionality of an integrated circuit segment to be lithographically printed on a wafer. Initially there is provided a two-dimensional design of an integrated circuit, including an integrated circuit segment having critical width, and a two-dimensional printed image of the critical width integrated circuit segment is simulated. The method then includes determining a ratio of perimeters or areas of the designed critical width integrated circuit segment to the simulated printed critical width integrated circuit segment, and predicting functionality of the critical width integrated circuit segment after printing based on the ratio of perimeters or areas.

9 Claims, 6 Drawing Sheets

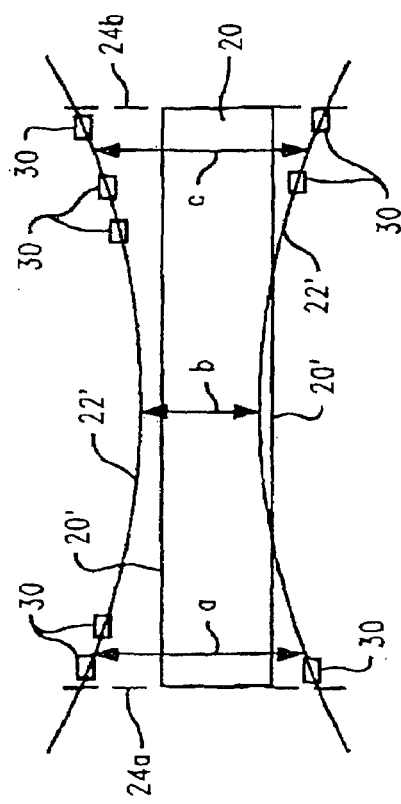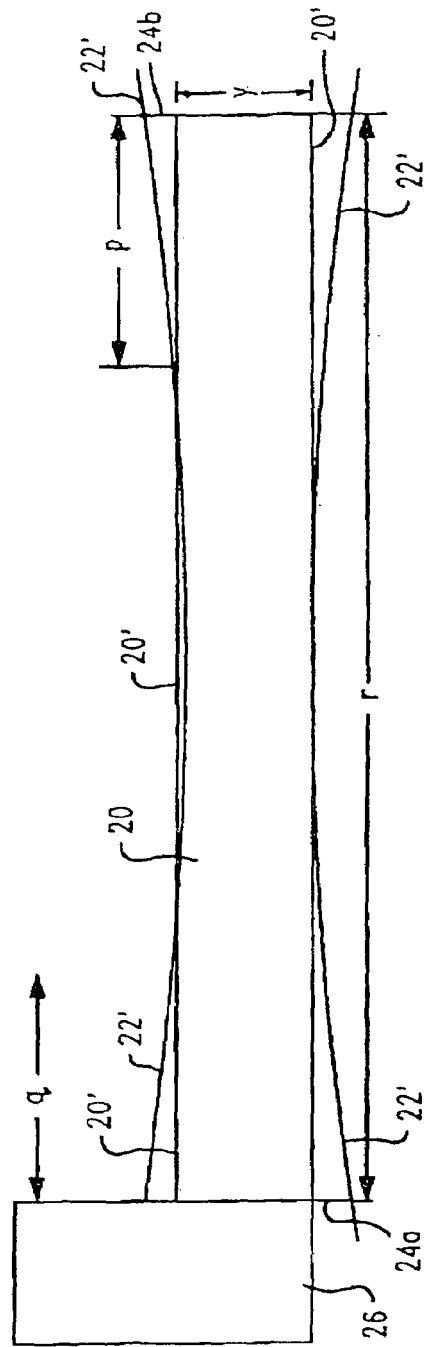

METHODOLOGY FOR IMAGE FIDELITY VERIFICATION

BACKGROUND OF THE INVENTION

1. Field of the Invention

The present invention relates generally to semiconductor manufacturing and, more particularly, to the verification of lithographic printing of shapes used in microelectronic devices.

2. Description of Related Art

Current state of the art lithographic printing processes are able to reproduce consistent polysilicon line widths below 100 nm. As used herein, the term critical dimension (CD) or critical width refers to the smallest dimension of a shape, pattern or feature that can be produced by the lithographic system. However, as the line widths are scaled down, the roughness of the line edges does not scale down similarly. Edge roughness of polysilicon lines is typically on the order of 5 nm, but can have values much higher than that, depending on how the line was formed. Including other causes, total line width variability can increase to above 10 nm. For proper operation, electronic devices incorporating gates are required to control gate length within approximately 8 nm. Edge roughness is therefore one of the primary concerns in controlling channel length for such devices.

Currently, there is no safe method of predicting imaging for such small width polysilicon lines prior to actually constructing a mask, developing wafers, and collecting results. This incurs great expense to the process. Physical measurements generally cannot accurately predict the electrical performance of electronic devices incorporating gates. Examination of simulated wafer images using optical and resist models for fidelity of the image to the desired target shape, sometimes referred to as Optical Rules Checking (ORC), is a step sometimes used for resolution enhancements for small line and gate patterning. Rapid simulation ORC techniques predict the wafer image based on image intensity profiles al selected spaced, but critical, sites along the shape generated during what is known as segmentation or fragmentation, similar to what is used for model-based ORC. Error statistics from these standard ORC techniques are generated using the optical properties computed at sites resulting from the chosen fragmentation scheme for the given data set and lithographic process. For most applications, these are adequate and provide ample image checking. However, in many cases, it has been determined that simulations based on image profiles at these sites are unable to represent adequately the intensity contours computed from a complete and detailed simulation on a dense grid, thereby missing some intra-line variation and many extraneous shapes and unwanted artifacts.

There is a need for an effective method of detecting design geometries whose printability by lithographic processes is at risk. It would be useful to be able to predict device functionality, particularly the potential for catastrophic failure, and to quantify the effectiveness of optical proximity correction (OPC) by classification of areas of the design.

SUMMARY OF THE INVENTION

Bearing in mind the problems and deficiencies of the prior art, it is therefore an object of the present invention to provide a method to predict functionality of critical dimension segments in microelectronic devices prior to mask making and lithographic printing.

It is another object of the present invention to provide a method of locating problem areas on shapes to be lithographically printed on wafers such as transistor gates.

A further object of the invention is to provide a method of evaluating shapes to be lithographically printed on wafers, in particular, transistor gates, that permits classification of the degree of the problem and time for corrective action.

Still other objects and advantages of the invention will in part be obvious and will in part be apparent from the specification.

The above and other objects, which will be apparent to those skilled in art, are achieved in the present invention which is directed to a method for predicting functionality of an integrated circuit segment to be lithographically printed on a wafer comprising initially providing a two-dimensional design of an integrated circuit, including an integrated circuit segment having critical width, and simulating a two-dimensional printed image of the critical width integrated circuit segment. The method then includes determining a ratio of perimeters or areas of the designed critical width integrated circuit segment to the simulated printed critical width integrated circuit segment, and predicting functionality of the critical width integrated circuit segment after printing based on the ratio of perimeters or areas.

Preferably, the simulation of the printed image of the critical width integrated circuit segment uses optical rules checking. The method may include determining differences in width between the designed critical width integrated circuit segment and the simulated printed critical width integrated circuit segment, and using the width differences to predict functionality of the critical width integrated circuit segment. The method may also include determining curvature of the simulated printed critical width integrated circuit segment with respect to the designed critical width integrated circuit segment, and using the curvature to predict functionality of the critical width integrated circuit segment. The method may further include determining location of edges of the simulated printed critical width integrated circuit segment with respect to edges of the designed critical width integrated circuit segment, and using the edge location to predict functionality of the critical width integrated circuit segment.

Markers may be applied to portions of edges of the simulated printed critical width integrated circuit segment that have excessive variation from edges of the designed critical width integrated circuit segment. Weighting factors may be applied to the markers identifying excessive variation from edges of the designed critical width integrated circuit segment. The weighting factors may be based on curvature of the simulated edge with respect to the designed edge, and/or on proximity of the simulated edge to concave or convex corners of the designed edge.

In another aspect, the present invention is directed to a method for predicting functionality of an integrated circuit segment to be lithographically printed on a wafer comprising initially providing a two-dimensional design of an integrated circuit, including an integrated circuit segment having critical width, and simulating a two-dimensional printed image of the critical width integrated circuit segment. The method then includes dividing the simulated printed critical width integrated circuit segment into subsegments based on deviation of edges of the simulated printed critical width integrated circuit segment with respect to edges of the designed critical width integrated circuit segment, and calculating theoretical current performance for each sub-segment of the simulated printed critical width integrated circuit segment. The method than predicts functionality of the critical width integrated circuit segment after printing based on the theoretical current performance of the sub-segments of the simulated printed critical width integrated circuit segment.

Preferably, the simulated printed critical width integrated circuit segment has a length, and the simulated printed critical width integrated circuit segment is divided in a direction normal to the length into the sub-segments.

The method may further include determining differences in width between the designed critical width integrated circuit segment and the simulated printed critical width integrated circuit segment, and the length of the sub-segments may be determined by the width differences.

The functionality of the critical width integrated circuit segment after printing may be predicted based on the theoretical current on and off densities for the sub-segments of the simulated printed critical width integrated circuit segment. In such case, the functionality of the critical width integrated circuit segment after printing is predicted based on the sums of the theoretical current on and off densities for the sub-segments of the simulated printed critical width integrated circuit segment.

In a further aspect, the present invention is directed to a method for predicting functionality of an integrated circuit segment to be lithographically printed on a wafer comprising initially providing a two-dimensional design of an integrated circuit, including an integrated circuit segment having critical width and simulating a two-dimensional printed image of the critical width integrated circuit segment. The method then includes identifying one or more portions of the simulated printed critical width integrated circuit segment having high edge curvature compared to comparable portions of the designed critical width integrated circuit segment, and dividing high edge curvature portions of the simulated printed critical width integrated circuit segment into sub-segments. The method then includes calculating theoretical current performance for each sub-segment of the high edge curvature portions of the simulated printed critical width integrated circuit segment. Functionality of the critical width integrated circuit segment after printing is predicted based on the theoretical current performance of the sub-segments of the high edge curvature portions of the simulated printed critical width integrated circuit segment.

The simulated printed critical width integrated circuit segment has a length, and the high edge curvature portions of the simulated printed critical width integrated circuit segment are divided in a direction normal to the length into the sub-segments.

The functionality of the critical width integrated circuit segment after printing may be predicted based on the theoretical current on and off densities for the sub-segments of the high edge curvature portions of the simulated printed critical width integrated circuit segment.

The aforementioned methods are particularly useful where the critical width integrated circuit segment comprises a transistor gate.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a top plan view the ideal and simulated critical width gate segment showing tags used to identify regions of the simulated shape edge that vary excessively from the ideal shape edges.

FIG. 5 is a top plan view of an ideal critical width gate segment and a superimposed simulated configuration of the gate segment, extending from a non-critical width shape.

DESCRIPTION OF THE PREFERRED EMBODIMENTS(S)

In describing the preferred embodiment of the present invention, reference will be made herein to FIGS. 1-9 of the drawings in which like numerals refer to like features of the invention.

The present invention employs an image fidelity verification (IFV) technique that may be used to predict comparative performance of different OPC approaches to shape design, and may also be used at different steps of the OPC progression for a given approach. The benefits particularly include the capability of predicting and classifying line edge roughness (LER) to estimate performance of device made up of different lithographically produced shapes. The invention is particularly useful in predicting the functionality of gates employed in transistors and other microelectronic devices. This permits the mask fabrication for the design to proceed with higher confidence and success.

Figure 2:
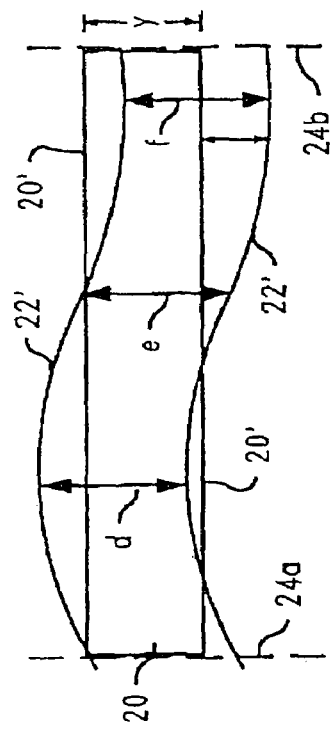
FIG. 2 is a top plan view of a desired, ideal critical width gate segment and the simulated, predicted configuration of the gate segment superimposed over each other, showing a small variation in critical dimension between the two.
Figure 1:
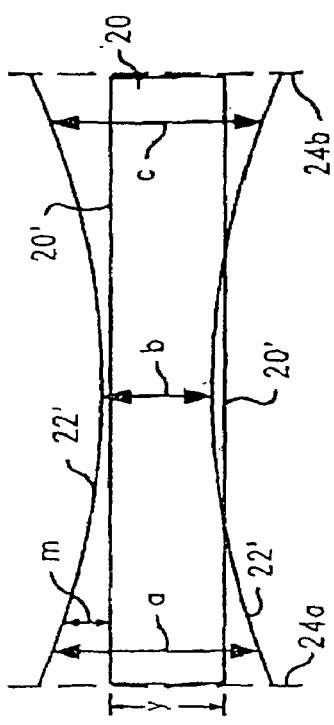
FIG. 1 is a top plan view of a desired, ideal critical width gate segment and the simulated, predicted configuration of the gate segment superimposed over each other, showing a large variation in critical dimension between the two.
Figure 3:
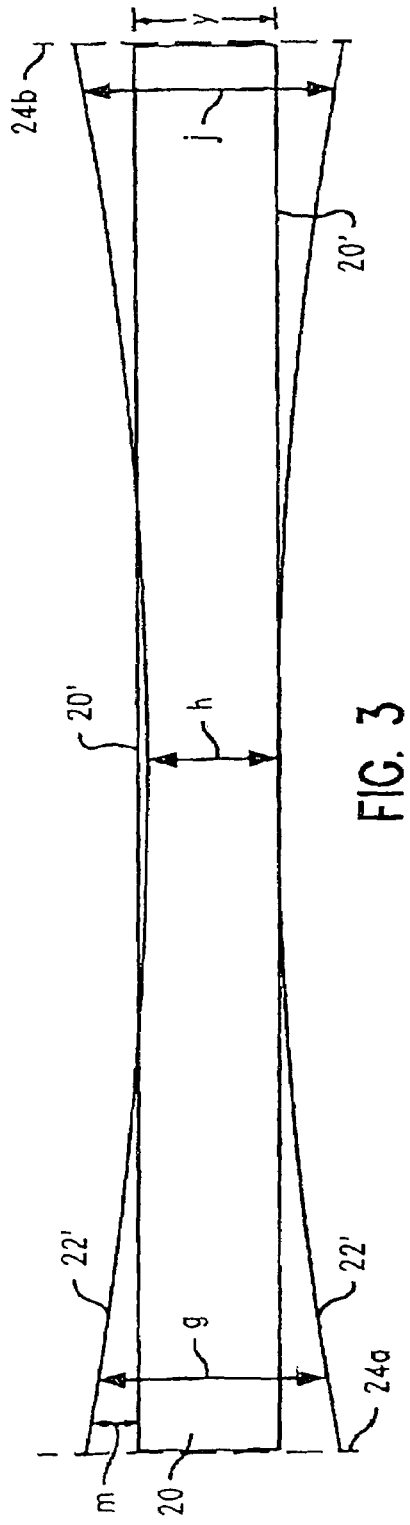
FIG. 3 is a top plan view of a desired, ideal critical width gate segment and the simulated, predicted configuration of the gate segment superimposed over each other, showing a small variation in critical dimension between the two over most of the gate length.

FIGS. 1, 2 and 3 depict desired, ideal, designed critical width rectangular polysilicon shapes 20, for example, integrated circuit devices such as metal oxide semiconductor (MOS) transistor gates deposited over a diffusion region, to be lithographically printed on a wafer. The ideal or designed shapes 20 have upper and lower edges 20' of critical line width y between ends 24a, 24b. Simulated configurations of the gate segments, as predicted by otherwise conventional ORC techniques, are superimposed over the ideal shapes, and have predicted upper and lower edges 22'. In FIG. 1, the simulated shape widths at different points along the length of the gate are shown as dimensions a, b and c. In FIG. 2, the simulated shape widths at different points along the length of the gate are shown as dimensions d, e and f. In FIG. 3, the simulated shape widths at different points along the length of the gates are shown as dimensions g, h, j. The dimensional variation between ideal and simulated edges at particular points along the length of the gates are shown as dimension m, and is one way to measure edge roughness. FIG. 1 shows a large variation in critical dimension between the ideal and simulated shape edges, FIG. 2 shows a smaller variation in critical dimension between the two, and FIG. 3 shows a small variation in critical dimension between the two over most of the gate length. However, if the maximum variation m between ideal and simulated edges were the same for each of the examples in FIGS. 1, 2 and 3, such edge-based roughness diagnosis would only capture a one-dimensional aspect of the distortion or variation in gate shape.

Instead of relying on isolated one-dimensional variations, the present invention preferably employs a perimeter ratio measurement to identify potential problem areas of edge roughness. The perimeters measured are the sum total of the lengths of the free sides of the segments, and do not include the cut edges that separate the segments being examined from the rest of the integrated circuit layout. Specifically, the lengths of the ideal edges 20' between ends 24a and 24b are measured, and the sum is divided by the sum of the lengths of the simulated edges 22'. For such ratio measurement, the simulated edge lengths would approach the ideal edge lengths at a value of 1. The result of ratio measurements for the examples shown would be that the ideal/simulated perimeter ratio of FIG. 1 is smaller than the ideal/simulated perimeter ratio of FIG. 2, which is smaller than the ideal/simulated perimeter ratio of FIG. 3. If the ideal and simulated shapes of FIGS. 1, 2 and 3 were identified as A, B and C, respectively, the relationship would be as follows:

Perimeter Ratio A<Perimeter Ratio B<Perimeter Ratio C

Subtracting each of the perimeter ratio values from 1, the optimum ratio, gives:

(1−Perimeter Ratio $A$)>(1−Perimeter Ratio $B$)>(1−Perimeter Ratio $C$)

The method of the present invention then determines for each of the ideal and simulated shapes a first weighting factor, k1, based on the determination of the greatest difference between the ideal shape width, y, and the actual simulated shape width at several points along the shape length. For the points identified in FIG. 1:

k1=the greatest of (($y−a$) or ($y−b$) or ($y−c$))

The value of k1 is determined similarly for FIGS. 2 and 3. From the previous calculations, k1×Perimeter Ratio $A$<k1×Perimeter Ratio $B$<k1× Perimeter Ratio $C$ By previous calculations of k1 and perimeter ratios on all shapes, the simulated A shape (FIG. 1) is found to be most in need of correction, while the simulated B shape (FIG. 2) and the simulated C shape (FIG. 3) fall into the acceptable range.

Instead of comparing the perimeters of the ideal and simulated upper and lower edges together, the perimeters of only the ideal and simulated upper edge lengths, or only the ideal and simulated lower edge lengths, may be compared. This comparison between simulated edge lengths may also be extended to comparison of areas, i.e., the ratio of the area between ideal edges 20' to the area between simulated edges 22', as measured between ends 24a, 24b. Also, the ideal/simulated perimeter or area ratio may be taken over portions of less than the entire length of a shape, to identify regions of potential edge roughness problems.

Once the perimeter (or area) ratio of ideal/simulated edge lengths is determined for a shape or portion thereof, a minimum ratio is established to identify simulated shape for further evaluation and possible correction of shape edge roughness. Such minimum ratio may be determined based on the requirements of the particular application without undue experimentation. Markers or tags may be generated to identify regions of the simulated shape edge that vary excessively from the ideal shape, such as tags 30 in FIG. 4, which identify portions of the simulated shape edge shown previously in FIG. 1. The markers or tags may be weighted based on the perimeter ratio criterion described above. Alternatively, other classifications systems may be used, such as by assigning the value to how close the simulated shape edges are to the ideal shape edges, e.g., whether they generally coincide (good) or are entirely offset (bad).

The assigned weight to the markers or tags may be lesser when the curvature of the simulated edge is less than an angle 45° with respect to the ideal edge or, alternatively, in the proximity of concave or convex corners. For example, in FIG. 5 the ideal shape 20 extends from polysilicon shape 26 of greater than critical width. Simulated shape edge 22' within distance q from the concave (inside) corner is assigned a lesser weight than it would have been if not close to the corner. Likewise, the variation of simulated edge 22' within distance p from the convex (outside) corner at the free right end of shape 20 is also assigned a lesser weight, particularly when the distance ratio of the length of edge variation a to the total length of the shape b does not exceed a predetermined value of another weighting factor, k2, for example, 10%. The weight of the marker or tag may be used in otherwise conventional OPC and ORC correction by reducing the fragmentation of the shape in that region.

Figure 8:
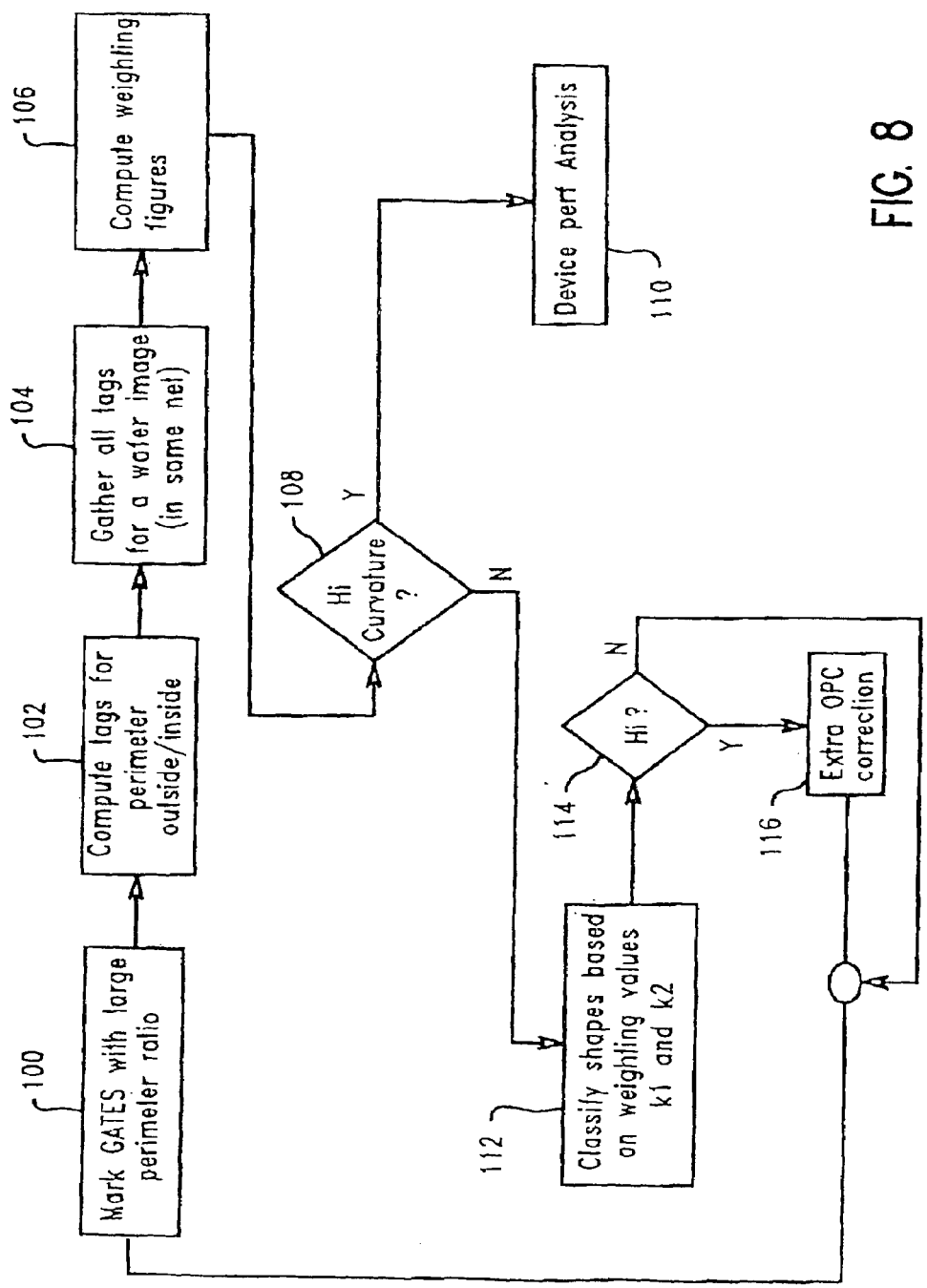
FIG. 8 is a flow diagram of the preferred method of identifying excessive perimeter ratio, computing tags for excessive deviation and computing weighting factors to predict functionality of the integrated circuit segments.

FIG. 8 shows a flowchart of the initial preferred steps in identifying excessive perimeter ratio, computing tags or markers for excessive deviation and computing weighting factors to predict functionality of the integrated circuit segments. After identifying and marking those shapes having a large ideal/simulated ratio of perimeter or area, 100, tags may be created that mark whether the simulated shape edge is outside or inside the ideal shape edge, 102. Then all of the perimeter outside/inside tags or markers are collected for each wafer image, 104, and the weighting figures are computed, 106. Based on the computed weighting figures, the degree of curvature of the simulated perimeter is determined, 108. If the degree of curvature is greater than a predetermined level, a performance analysis is performed on the device shape, 110, as described further below. If the degree of curvature is less than a predetermined level, the shapes are classified based on weighting values k1, k2, 112. If the shape weighting values are determined to be above a predetermined level, 114, additional optical proximity correction (OPC) is performed on the simulated shape, 116. Subsequently, the shapes are then re-evaluated to determine the simulated/ideal perimeter ratio, 100.

For a non-rough gate, short channel drain currents are dependent on polysilicon gate length ($L_{poly}$), as follows:

$$I_{on} = \frac{w}{L}\mu_{eff}C_{ox}\left(V'_g - \frac{V_d}{2}\right)V_d \frac{1}{1+\frac{V_d}{E_{sat}L}}$$

$$\log(I_{off}) \sim \log(CI_d) - \frac{BL}{V_d - V_{dsat}}$$

where:
$I_{on}$=on current density
$I_{off}$=off current density
L=gate length
w=gate width
$\mu_{eff}$=effective mobility of carriers
$C_{ox}$=gate oxide capacitance
$V_g$=gate voltage
$V_d$=drain voltage
$E_{sat}$=Saturation Field In the gate example used herein, it has been determined that there is a link between device performance, e.g., on and off current density ($I_{on}$, $I_{off}$) and the like, and line edge roughness of the polysilicon gate. This link is based on the use of multiple two-dimensional slices or segments to form a MOS transistor of a desired width. The device performance metrics of $I_{on}$ and $I_{off}$ are determined by the equation below, where L=gate slice length and W=gate slice width, and the dimension $w_i$ is selected to pick up lower frequency line edge roughness only (since high frequency line edge roughness typically has little or no effect on device performance):

$$I_{on(off)} \approx \frac{1}{W}\sum_{i=1}^{N} w_i I^i_{on(off)}(L_i)$$

where:

$$W = \sum_{i=1}^{N} w_i$$

Figure 6:
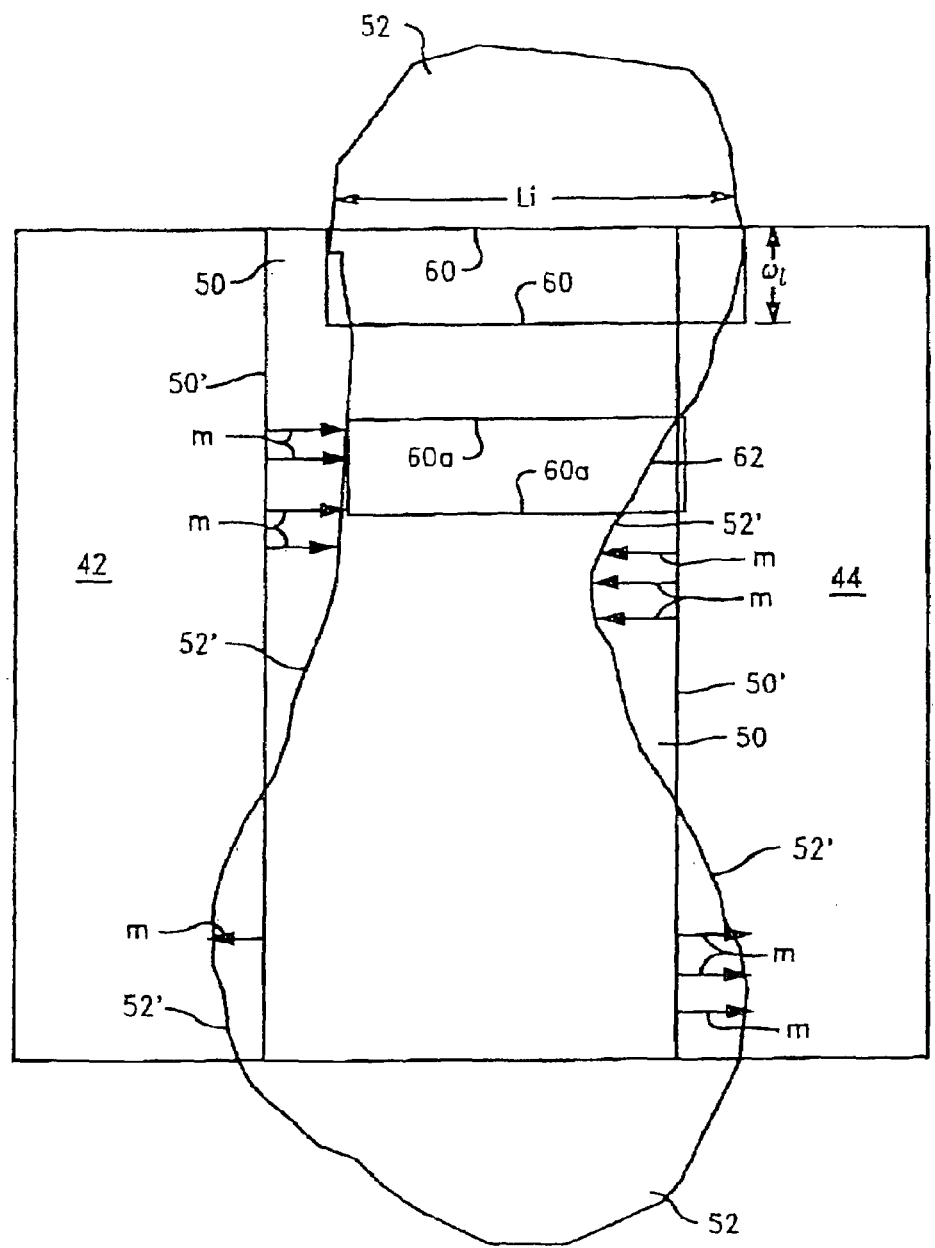
FIG. 6 is a top plan view of a simulated gate shape with slices or segments to identify edge curvature.
Figure 7:
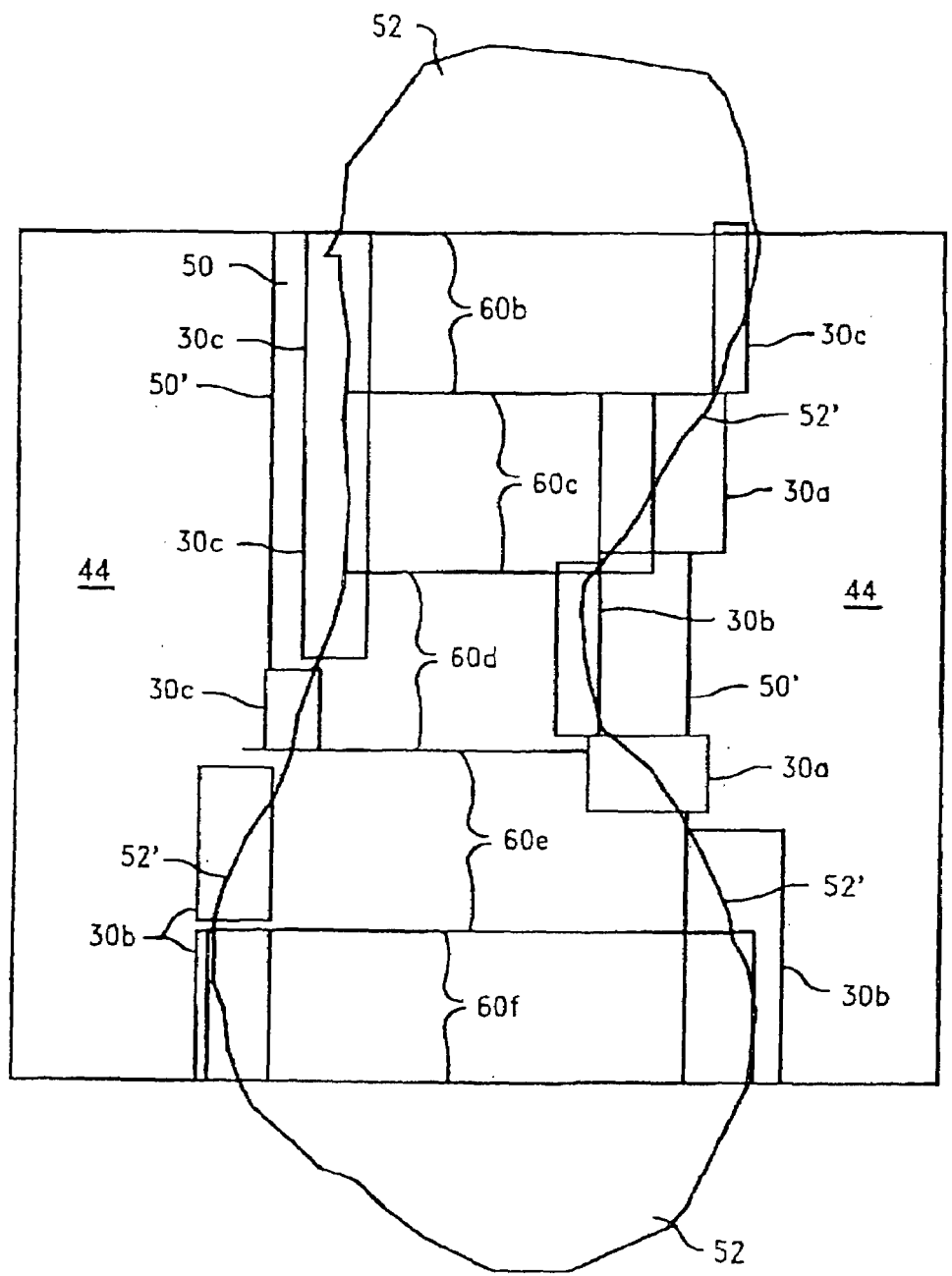
FIG. 7 is a top plan view of the simulated gate shape of FIG. 6 with slices along the entire gate.

FIGS. 6 and 7 depict the slicing or segmenting of a simulated gate shape to calculate $I_{on}$ and $I_{off}$. An ideal gate shape 50 overlies source and drain regions 42, 44, respectively. Ideal gate edges are shown as lines 50'. Superimposed over the ideal gate shape is simulated gate shape 52 having simulated gate edges 52'. The simulated gate edges 52' vary from ideal gate edges 50' by distance m measured at various positions along the gate. To determine the $I_{on}$ and $I_{off}$ values as described above, a gate slice 60 is made (FIG. 6), having gate slice length $L_i$ and gate slice width, $w_i$, as indicated. Gate slice width $w_i$ is selected to detect lower frequency line edge roughness only, since high frequency, i.e., very small $w_i$, has no effect on $I_{on}$ and $I_{off}$ value. FIG. 6 also shows gate slice 60a identifying a region of high edge curvature by generating an angle mark 62 approximating the simulated edge.

FIG. 7 shows tags or markers 30a, 30b, 30c, generated as described previously, that identify regions of the simulated shape edge that vary to different degrees from the ideal shape. Markers 30a identify the simulated edges of higher weight, because of high edge curvature, while markers 30b identify other simulated edge problem areas, because of curvature or excessive distance from the ideal gate edge, but of lesser weight than markers 30a. Markers 30c identify simulated edge regions of least weight or problem, since they are close to the ideal edges. Slices 60b, 60c, 60d, 60e and 60f may be generated with widths $w_i$ conforming to markers on one side of the gate or the other.

Figure 9:
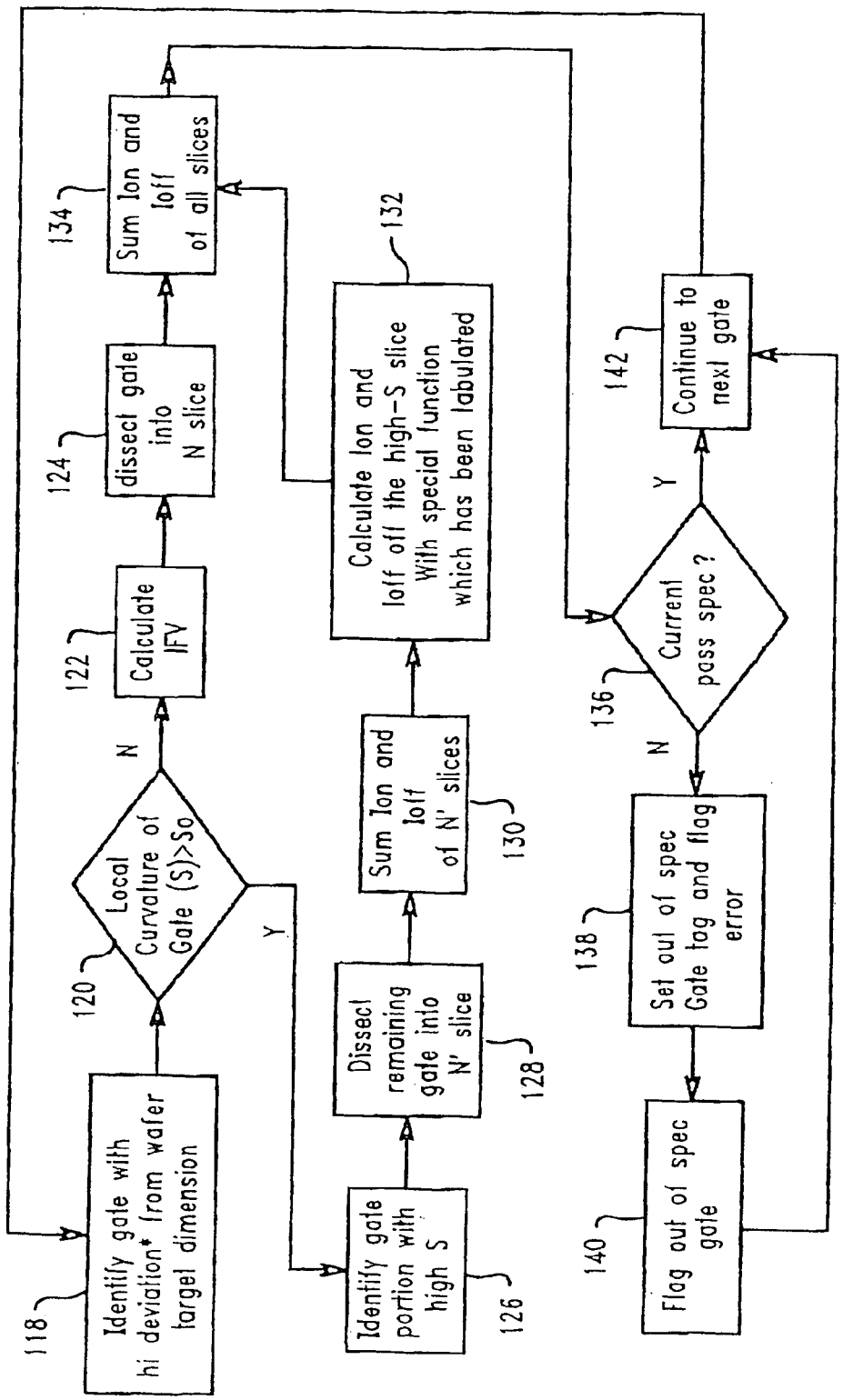
FIG. 9 is a flow diagram of the preferred method of predicting functionality of an integrated circuit segment to be lithographically printed on a wafer.

FIG. 9 depicts the preferred steps in flowchart form of predicting functionality of an integrated circuit segment to be lithographically printed on a wafer. Those shapes for which a performance analysis is to be made (step 110 of FIG. 8) are identified, 118, and the local curvature of the shape edges is measured to determine if it is greater than a predefined level $S_0$, 120. If the local curvature of the shape being measured is above the level $S_0$, those portions are identified, 126, and the remaining shape is cut or dissected into a number N' of smaller segments, 128. The individual $I_{on}$ and $I_{off}$ values are calculated for each gate remaining slice or segment, as described above, and sum of the $I_{on}$ and $I_{off}$ values is determined, 130. The $I_{on}$ and $I_{off}$ values of the high $S_0$ level slice or segment is also calculated by special function using interpolation of tabulated result using 3D device simulation, 132. The sum of the $I_{on}$ and $I_{off}$ values of the high $S_0$ level slice or segment and the remaining N' slices is then determined, 134.

In the event that the local curvature of the shape measured in step 120 is below the level $S_0$, the image fidelity verification (IFV) is calculated, 122, and the shape is cut or dissected into a number N of smaller segments, 124. The sum of the $I_{on}$ and $I_{off}$ values of the N slices or segments is then determined, 134.

The sum of the $I_{on}$ and $I_{off}$ values of the slices being measured are then compared to the on and off current density specifications for the gate shape in question, 136. If the currents do not meet specifications, the tag to identify the gate as out of specification is set, 138, and the gate is identified as being out of specification, 140. If the calculated on and off current densities meet specifications for the gate shape, the next gate is identified, 142, and the determination is again made whether it has an excessively high deviation from wafer target dimension, 118, according to the procedures summarized in FIG. 9. This process of FIG. 9 continues until the current densities of all desired gates are calculated from the simulated gate shapes.

The image fidelity verification (IFV) calculation as described herein is based on the ratio of the ideal shape perimeter to the simulated shape perimeter, and evaluates the two-dimensional aspect of the lithographic printing process, and is believed to be a better predictor of catastrophic failure in resolution enhancement technique (RET) and OPC enhanced mask images. The present invention predicts functionality of critical dimension segments, i.e., whether or not they print well, and whether the lithographic process is flawed. By using the method of the present invention, one may establish realistic tolerances to be targeted in the model build stage, and detect costly future problems at an early stage, prior to fabricating the mask and lithographically printing the device segment on the wafer. Proper corrective action may then be made using otherwise conventional RET and OPC techniques.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for predicting functionality of and correcting an integrated circuit segment to be lithographically printed on a wafer comprising:
    providing a two-dimensional design of an integrated circuit, including an integrated circuit segment having critical width;
    simulating a two-dimensional printed image of the critical width integrated circuit segment;
    determining a ratio of perimeters or areas of the designed critical width integrated circuit segment to the simulated printed critical width integrated circuit segment;
    determining degree of curvature of edges of the simulated printed critical width integrated circuit segment with respect to edges of the designed critical width integrated circuit segment;
    predicting functionality of the critical width integrated circuit segment after printing based on the ratio of perimeters or areas and degree of curvature of the simulated printed critical width integrated circuit segment with respect to the designed critical width integrated circuit segment; and
    correcting the critical width integrated circuit segment based on predicted functionality thereof.

2. The method of claim 1 wherein the simulation of the printed image of the critical width integrated circuit segment uses optical rules checking.

3. The method of claim 1 further including determining differences in width between the designed critical width integrated circuit segment and the simulated printed critical width integrated circuit segment and using the width differences to predict functionality of the critical width integrated circuit segment.

4. The method of claim 1 further including determining location of edges of the simulated printed critical width integrated circuit segment with respect to edges of the designed critical width integrated circuit segment, and using the edge location to predict functionality of the critical width integrated circuit segment.

5. The method of claim 1 further including applying markers to portions of edges of the simulated printed critical width integrated circuit segment that have excessive variation from edges of the designed critical width integrated circuit segment.

6. The method of claim 5 further including applying weighting factors to the markers identifying excessive variation from edges of the designed critical width integrated circuit segment.

7. The method of claim 6 wherein the weighting factors are based on curvature of the simulated edge with respect to the designed edge.

8. The method of claim 6 wherein the weighting factors are based on proximity of the simulated edge to concave or convex corners of the designed edge.

9. The method of claim 1 wherein the critical width integrated circuit segment comprises a transistor gate.

* * * * *